(12) United States Patent
Alvarino et al.

(10) Patent No.: US 10,098,120 B2
(45) Date of Patent: Oct. 9, 2018

(54) UPLINK GRANTS FOR NARROWBAND INTERNET-OF-THINGS

(71) Applicant: QUALCOMM Incorporated, San Diego, CA (US)

(72) Inventors: Alberto Rico Alvarino, San Diego, CA (US); Peter Gaal, San Diego, CA (US); Hao Xu, San Diego, CA (US); Wanshi Chen, San Diego, CA (US); Xiao Feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 79 days.

(21) Appl. No.: 15/345,540

(22) Filed: Nov. 8, 2016

(65) Prior Publication Data

US 2017/0208591 A1    Jul. 20, 2017

Related U.S. Application Data

(60) Provisional application No. 62/280,679, filed on Jan. 19, 2016.

(51) Int. Cl.
*H04W 72/04* (2009.01)
*H04W 4/70* (2018.01)
(Continued)

(52) U.S. Cl.
CPC ........ *H04W 72/0453* (2013.01); *H04B 1/713* (2013.01); *H04B 1/7143* (2013.01);
(Continued)

(58) Field of Classification Search
CPC ..... H04W 4/70; H04W 4/005; H04W 72/048; H04W 72/0453; H04W 8/22;
(Continued)

(56) References Cited

U.S. PATENT DOCUMENTS 9,137,073 B2 * 9/2015 Chun ................ H04L 27/2602
9,860,678 B2 * 1/2018 Oh .......................... H04W 4/70
(Continued)

FOREIGN PATENT DOCUMENTS

WO    WO-2013049768 A1    4/2013

OTHER PUBLICATIONS

Huawei et al., "DCI for NB-IoT," 3GPP Draft; R1-160032, 3rd Generation Partnership Project (3GPP), Mobile Competence Centre, 650, Route Des Lucioles, F-06921 Sophia-Antipolis Cedex, France vol. RAN WG1, No. Budapest, HU, Jan. 18, 2016-Jan. 20, 2016 Jan. 17, 2016 (Jan. 17, 2016). XP051053355, Retrieved from the Internet: URL:http://www.3gpp.org/ftp/Meetings_3GPP_SYNC/RAN1/Docs/ [retrieved on Jan. 17, 2016] sections 2. 2.1, 3, 3 pages.
(Continued)

*Primary Examiner* — Man U Phan
(74) *Attorney, Agent, or Firm* — Patterson & Sheridan, L.L.P.

(57) ABSTRACT

Certain aspects of the present disclosure relate to methods and apparatus for uplink grant design for Narrow-Band Internet of Things (NB-IoT). A method is provided for wireless communications by a user equipment (UE). The method generally includes receiving an uplink grant indicating one or more tones within a resource block (RB) allocated to the UE for narrowband communication and transmitting using the one or more tones indicated in the uplink grant.

48 Claims, 16 Drawing Sheets

(51) Int. Cl.
H04B 1/713 (2011.01)
H04B 1/7143 (2011.01)
H04L 1/00 (2006.01)
H04L 5/00 (2006.01)
H04L 27/18 (2006.01)
H04L 29/08 (2006.01)
H04W 8/22 (2009.01)
H04W 72/12 (2009.01)

(52) U.S. Cl.
CPC ......... *H04L 1/0003* (2013.01); *H04L 5/0007* (2013.01); *H04L 5/0039* (2013.01); *H04L 5/0044* (2013.01); *H04L 5/0053* (2013.01); *H04L 5/0064* (2013.01); *H04L 27/18* (2013.01); *H04L 67/12* (2013.01); *H04W 4/70* (2018.02); *H04W 8/22* (2013.01); *H04W 72/048* (2013.01); *H04W 72/1289* (2013.01); *H04L 5/0094* (2013.01); *H04W 72/1268* (2013.01)

(58) Field of Classification Search
CPC .... H04W 72/1268; H04B 1/713; H04L 27/18; H04L 5/0039
USPC .................................................. 370/311–336
See application file for complete search history.

(56) References Cited

U.S. PATENT DOCUMENTS

| | | | | |
|---|---|---|---|---|
| 9,863,846 | B2* | 1/2018 | Ichikawa | G01M 13/025 |
| 9,867,191 | B2* | 1/2018 | Wong | H04W 72/0453 |
| 2013/0083753 | A1* | 4/2013 | Lee | H04W 72/0453 |
| | | | | 370/329 |
| 2014/0301262 | A1* | 10/2014 | Homchaudhuri | |
| | | | | H04W 52/0235 |
| | | | | 370/311 |
| 2016/0338062 | A1* | 11/2016 | Rico-Alvarino | |
| | | | | H04W 72/0453 |
| 2017/0171841 | A1* | 6/2017 | Chen | H04W 72/042 |
| 2017/0201403 | A1* | 7/2017 | Johansson | H04B 7/0639 |
| 2017/0223725 | A1* | 8/2017 | Xiong | H04W 4/70 |
| 2017/0311326 | A1* | 10/2017 | Wong | H04W 72/0453 |
| 2018/0077696 | A1* | 3/2018 | Lee | H04W 4/70 |

OTHER PUBLICATIONS

International Search Report and Written Opinion—PCT/US2016/067274—ISA/EPO—dated May 15, 2017.
QUALCOMM Incorporated: "Description of 8-BPSK and TPSK for the NB-IoT uplink," 3GPP Draft; R1-160108 Description of 8-BPSK and TPSK for the NB-IOT Uplink, 3rd Generation Partnership Project (3GPP), Mobile Competence Centre ; 650, Route Des Lucioles ; F-06921 Sophia-Antipolis CED vol. RAN WG1, No. Budapest, HU; Jan. 18, 2016-Jan. 20, 2016 Jan. 17, 2016 (Jan. 17, 2016), XP051053428, Retrieved from the Internet: URL:http://www.3gpp.org/ftp/Meetings_3GPP_SYNC/RAN1/Docs/—[retrieved on Jan. 17, 2016] sections 2, 3, 10 pages.
Sony: "Considerations on NB-PUSCH in NB-IoT," 3GPP Draft; R1-160178, 3rd Generation Partnership Project (3GPP), Mobile Competence Centre; 650, Route Des Lucioles; F-06921 Sophia-Antipolis Cedex ; France vol. RAN WG1, No. Budapest, HU; Jan. 18, 2016-Jan. 20, 2016Jan. 17, 2016 (Jan. 17, 2016), XP051053497, Retrieved from the Internet: URL:http://www.3gpp.org/ftp/Meetings_3GPP_SYNC/RAN1/Docs/—[retrieved on 2816-81-17] sections 1, 2, 4 pages.
ZTE: "Uplink Data Channel with 15 kHz Subcarrier Spacing for NB-IoT," 3GPP Draft; R1-160053 NB-PUSCH 15KHZ, 3rd Generation Partnership Project (3GPP), Mobile Competence Centre ; 650, Route Des Lucioles ; F-06921 Sophia-Antipolis Cedex ; France vol. RAN WGl, No. Budapest, HU; Jan. 18, 2016-Jan. 20, 2016 Jan. 11, 2016 (Jan. 11, 2016), XP051064636, Retrieved from the Internet: URL:http://www.3gpp.org/ftp/tsg ran/WG1_RL1/TSGR1 AH/LTE_NB-IoT_1601/Docs/—[retrieved on Jan. 11, 2016] section 2.2 and Table 1, 7 pages.

* cited by examiner

UPLINK GRANTS FOR NARROWBAND INTERNET-OF-THINGS

CROSS-REFERENCE TO RELATED APPLICATION & PRIORITY CLAIM

This application claims benefit of and priority to U.S. Provisional Patent Application Ser. No. 62/280,679, filed Jan. 19, 2016, which is herein incorporated by reference in its entirety for all applicable purposes.

BACKGROUND

Field of the Disclosure

The present disclosure relates generally to wireless communication, and more particularly, to methods and apparatus for an uplink design for narrowband Internet-of-Things (NB-IoT).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit).

Some next generation, NR, or 5G networks may support an uplink-based medium access control (MAC) layer. In these networks, a UE may transmit a pilot signal (e.g., a reference signal) for network access devices (e.g., distributed units) to receive and measure. Based on measurements of the pilot signal by one or more network access devices, the network may identify a serving cell (or serving distributed unit) for the UE. As the UE moves within the network, the network may make at least some mobility decisions for the UE (e.g., decisions to initiate a handover of the UE from one serving cell to another serving cell) transparently to the UE (e.g., without notifying the UE of the mobility decision, or without involving the UE in the mobility decision).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards, e.g., using OFDMA with a cyclic prefix (CP) on the downlink (DL) and on the uplink (UL) or a non-OFDMA based air interface, as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to methods and apparatus for an uplink design for narrowband Internet-of-Things (NB-IoT).

Certain aspects of the present disclosure provide a method for wireless communications by a user equipment (UE). The method generally includes receiving an uplink grant indicating one or more tones within a resource block (RB) allocated to the UE for narrowband communication and transmitting using the one or more tones indicated in the uplink grant.

Certain aspects of the present disclosure provide a method for wireless communications by a base station (BS). The method generally includes sending an uplink grant to a UE indicating one or more tones within a RB allocated to the UE for narrowband communication and receiving transmissions from the UE on the one or more tones indicated in the uplink grant.

Certain aspects of the present disclosure provide an apparatus for wireless communications such as a UE. The apparatus generally includes means for receiving an uplink grant indicating one or more tones within a RB allocated to the UE for narrowband communication and means for transmitting using the one or more tones indicated in the uplink grant.

Certain aspects of the present disclosure provide an apparatus for wireless communications such as a BS. The apparatus generally includes means for sending an uplink grant to a UE indicating one or more tones within a RB allocated to the UE for narrowband communication and means for receiving transmissions from the UE on the one or more tones indicated in the uplink grant.

Certain aspects of the present disclosure provide an apparatus for wireless communications such as a UE. The apparatus generally includes a receiver configured to receive an uplink grant indicating one or more tones within a RB allocated to the UE for narrowband communication and a transmitter configured to transmit using the one or more tones indicated in the uplink grant.

Certain aspects of the present disclosure provide an apparatus for wireless communications such as a BS. The apparatus generally includes a transmitter configured to send an uplink grant to a UE indicating one or more tones within a RB allocated to the UE for narrowband communication and a receiver configured to receive transmissions from the UE on the one or more tones indicated in the uplink grant.

Certain aspects of the present disclosure provide a computer readable medium having computer executable code stored thereon for wireless communications by a UE. The code generally includes code for receiving an uplink grant indicating one or more tones within a RB allocated to the UE for narrowband communication and code for transmitting using the one or more tones indicated in the uplink grant.

Certain aspects of the present disclosure provide a computer readable medium having computer executable code stored thereon for wireless communications by a BS. The code generally includes code for sending an uplink grant to a UE indicating one or more tones within a RB allocated to the UE for narrowband communication and code for receiving transmissions from the UE on the one or more tones indicated in the uplink grant.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
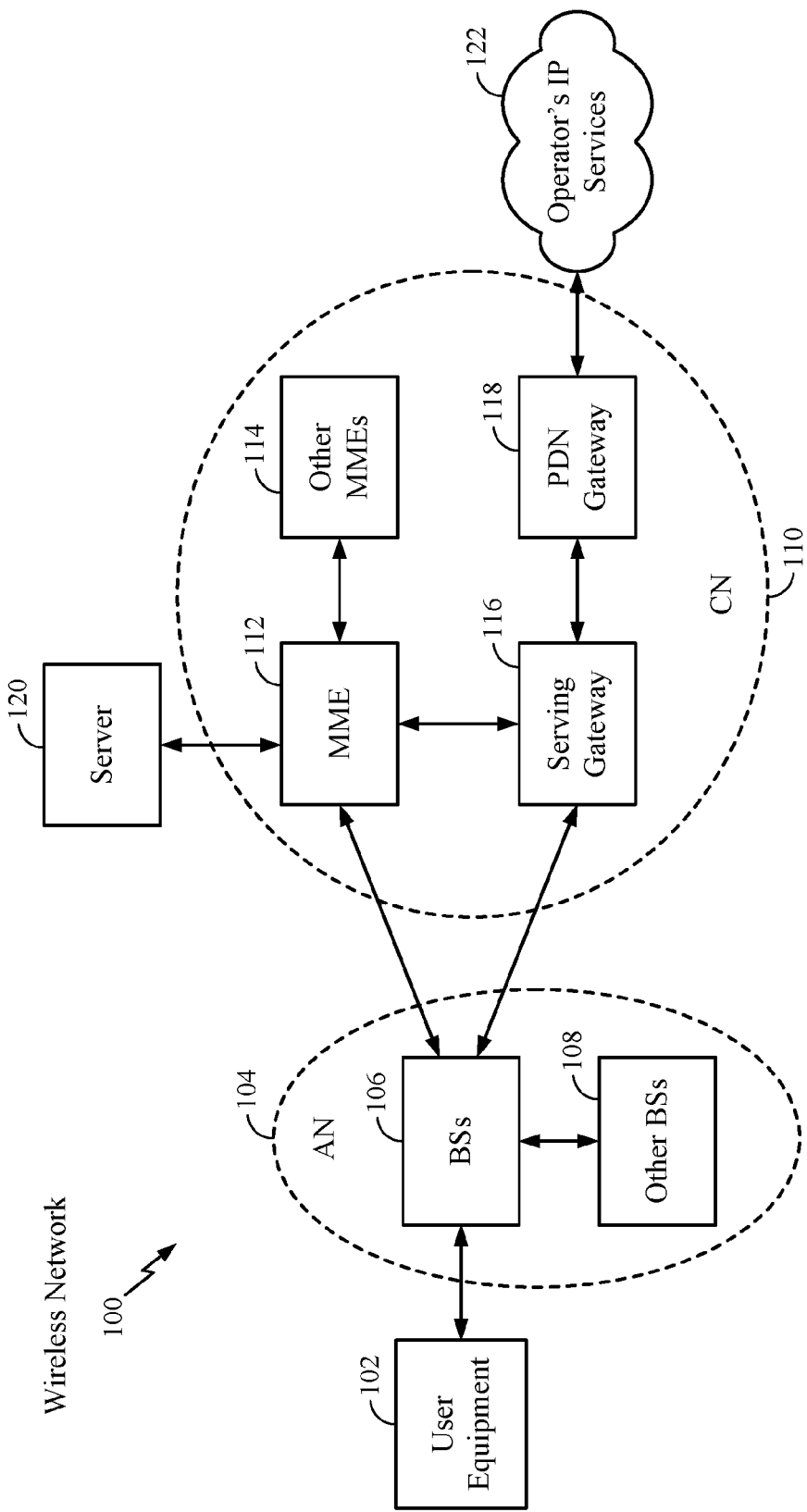
FIG. 1 is a diagram illustrating an example of a network architecture, in accordance with certain aspects of the present disclosure.

Narrowband Internet-of-Things (NB-IoT) is a technology being standardized by the IEEE 3GPP standards body. This technology is a narrowband radio technology specially designed for the Internet-of-Things. Some of NB-IoT design focuses on indoor coverage, low cost devices, long battery life, and scenarios involving large numbers of devices. NB-IoT technology may be deployed "in-band", utilizing resource blocks within an existing spectrum such as the long term evolution (LTE) spectrum or the Global System for Mobile communications (GSM) spectrum. In addition, NB-IoT technology may be deployed in the unused resource blocks within a carrier guard-band (e.g., an LTE carrier), or for "standalone" deployment, NB-IoT technology can be deployed in a dedicated spectrum (e.g., dedicated for NB-IoT operation) rather than one of the existing spectrums.

Aspects of the present disclosure provide uplink design and uplink grants for NB-IoT. For example, NB-IoT may support tone sizes of 15 kHz and/or 3.75 kHz. Further, an uplink grant may schedules resources for NB-IoT using a scheduling unit size of a single tone, 3 tones, 6 tones, and/or 12 tones. Thus, there may be multiple possible combinations that can be signaled by the uplink grant. In aspects, the size (e.g., number of bits) of the uplink grant may depend on the number of combinations to be signaled and/or the tone size (e.g., 15 kHz or 3.75 kHz). In some cases, the number of combinations can be reduced. For example, starting tone positions can be restricted.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating an example network architecture for a wireless network 100 in which aspects of the present disclosure may be practiced. For example user equipment (UE) 102 may receive an uplink grant from a base station (BS) 106 or 108 indicating one or more tones within a resource block (RB) allocated to the UE 102 for narrowband communication. The UE 102 may transmit using the one or more tones indicated in the uplink grant.

In some cases, the wireless network 100 (e.g., an Evolved Packet System (EPS)) may include one or more UE 102, an access network 104 (e.g., an Evolved UMTS Terrestrial Radio Access Network (E-UTRAN)), a core network 110 (e.g., an Evolved Packet Core (EPC)), which may be connected to a server 120 (e.g., a Home Subscriber Server (HSS)) and to Operator's IP Services 122. The wireless network 100 can interconnect with other access networks, but for simplicity those entities/interfaces are not shown. Exemplary other access networks may include an IP Multimedia Subsystem (IMS) packet data network (PDN), Internet PDN, Administrative PDN (e.g., Provisioning PDN), carrier-specific PDN, operator-specific PDN, and/or global positioning system (GPS) PDN. The wireless network 100 may provide packet-switched services, however, as those skilled in the art will readily appreciate, the various concepts presented throughout this disclosure may be extended to networks providing circuit-switched services.

The access network 100 may include the base station 106 (e.g., an evolved Node B (eNB)) and other BSs 108. The BS 106 may provide user and control plane protocol terminations toward the UE 102. The BS 106 may be connected to the other BSs 108 via an interface (e.g., an X2 backhaul). The BS 106 may also be referred to as a base transceiver station, a radio base station, a radio transceiver, a transceiver function, a basic service set (BSS), an extended service set (ESS), an access point, a node B (NB), a eNB, a gNB, a transmission reception point (TRP), a 5G NB, NR BS, or some other suitable terminology. The BS 106 may provide an access point to the core network 110 for a UE 102.

UEs 102 may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a base station, another device (e.g., remote device), or some other entity. MTC may refer to communication involving at least one remote device on at least one end of the communication and may include forms of communication which involve one or more entities that do not necessarily need human interaction. A wireless node may provide, for example, connectivity for or to a network (e.g., a wide area network such as Internet or a cellular network) via a wired or wireless communication link. Some UEs may be considered Internet-of-Things (IoT) devices, such as narrowband IoT (NB-IoT) devices.

The BS 106 is connected by an interface (e.g., an S1) to the core network 110. The core network 110 includes network elements, such as a Mobility Management Entity (MME) 112, other MMEs 114, a Serving Gateway 116, and a Packet Data Network (PDN) Gateway 118. The MME 112 is the control node that processes the signaling between the UE 102 and the core network 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the wireless network 100.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

Figure 2:
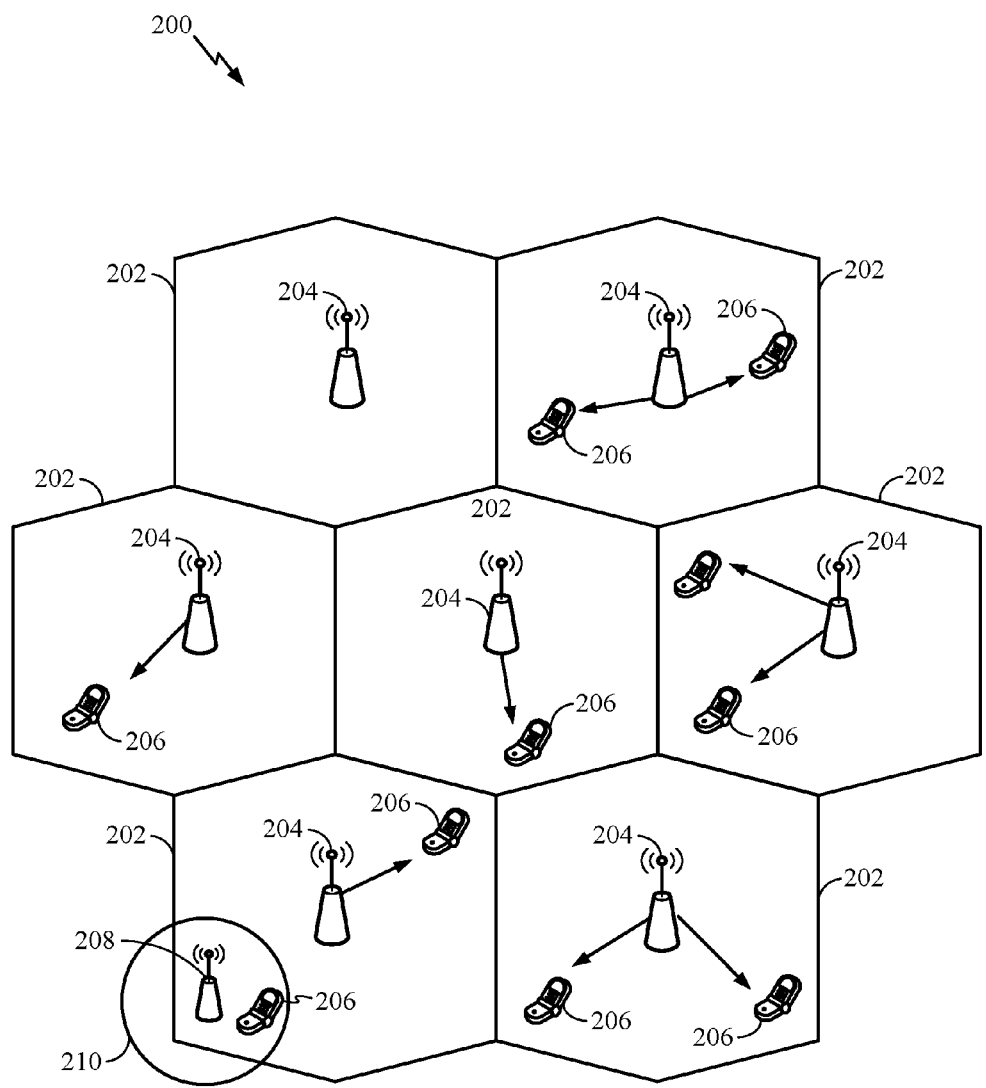
FIG. 2 is a diagram illustrating an example of an access network, in accordance with certain aspects of the present disclosure.

FIG. 2 is a diagram illustrating an example of an access network 200 in an LTE network architecture in which aspects of the present disclosure may be practiced. For example, UEs 206 and BSs 204 may be configured to implement techniques for uplink design and/or uplink grants for NB-IoT described in aspects of the present disclosure.

In this example, the access network 200 is divided into a number of cellular regions (cells) 202. One or more lower power class BSs 208 may have cellular regions 210 that overlap with one or more of the cells 202. A lower power class BS 208 may be referred to as a remote radio head (RRH). The lower power class BS 208 may be a femto cell (e.g., home eNB (HeNB)), pico cell, or micro cell. The macro BSs 204 are each assigned to a respective cell 202 and are configured to provide an access point to the access network 110 for all the UEs 206 in the cells 202. There is no centralized controller in this example of an access network 200, but a centralized controller may be used in alternative configurations. The BSs 204 are responsible for all radio related functions including radio bearer control, admission control, mobility control, scheduling, security, and connectivity to the serving gateway 116. The network 200 may also include one or more relays (not shown). According to one application, a UE 206 may serve as a relay.

The modulation and multiple access scheme employed by the access network 200 may vary depending on the particular telecommunications standard being deployed. In certain applications (e.g., LTE), OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for certain applications (e.g., LTE). However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. In some cases, NR or 5G RAT networks may be deployed. The actual wireless communication standard and the multiple access technology employed will depend on the specific application and the overall design constraints imposed on the system.

The BSs 204 may have multiple antennas supporting MIMO technology. The use of MIMO technology enables the BSs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s)

206 to recover the one or more data streams destined for that UE 206. On the UL, each UE 206 transmits a spatially precoded data stream, which enables the BS 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
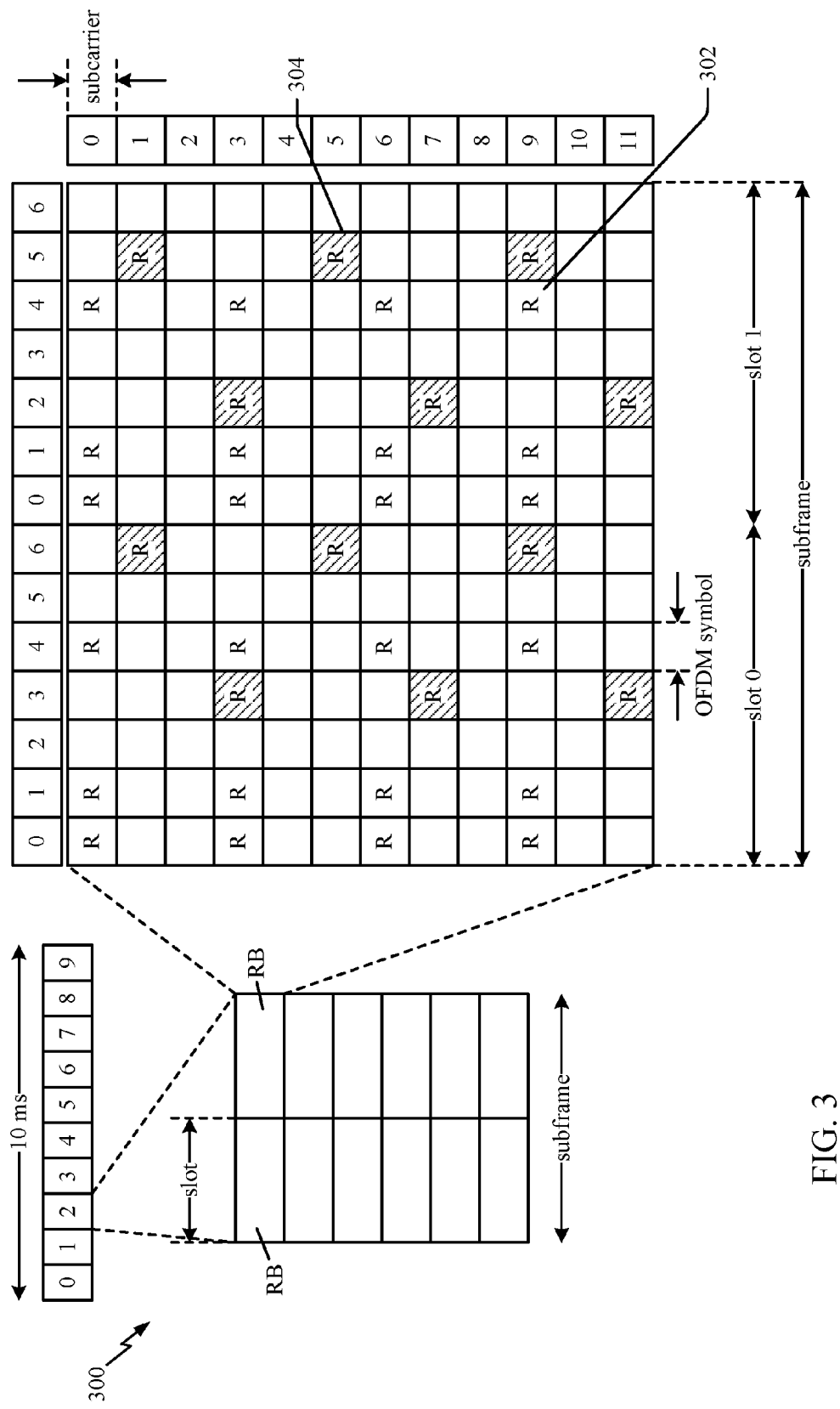
FIG. 3 is a diagram illustrating an example of a downlink frame structure in an access network, in accordance with certain aspects of the present disclosure.

FIG. 3 is a diagram 300 illustrating an example of a DL frame structure in an access network. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In certain systems (e.g., LTE), a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In certain systems (e.g., LTE), a BS may send a primary synchronization signal (PSS) and a secondary synchronization signal (SSS) for each cell in the BS. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The BS may send a Physical Broadcast Channel (PBCH) in symbol periods 0 to 3 in slot 1 of subframe 0. The PBCH may carry certain system information.

The BS may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The BS may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The BS may send a Physical Downlink Shared Channel (PDSCH) in the remaining symbol periods of each subframe. The PDSCH may carry data for UEs scheduled for data transmission on the downlink.

The BS may send the PSS, SSS, and PBCH in the center 1.08 MHz of the system bandwidth used by the BS. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

In certain systems (e.g., such as NR or 5G systems), a BS may transmit these or other signals in these locations or in different locations of the subframe.

Figure 4:
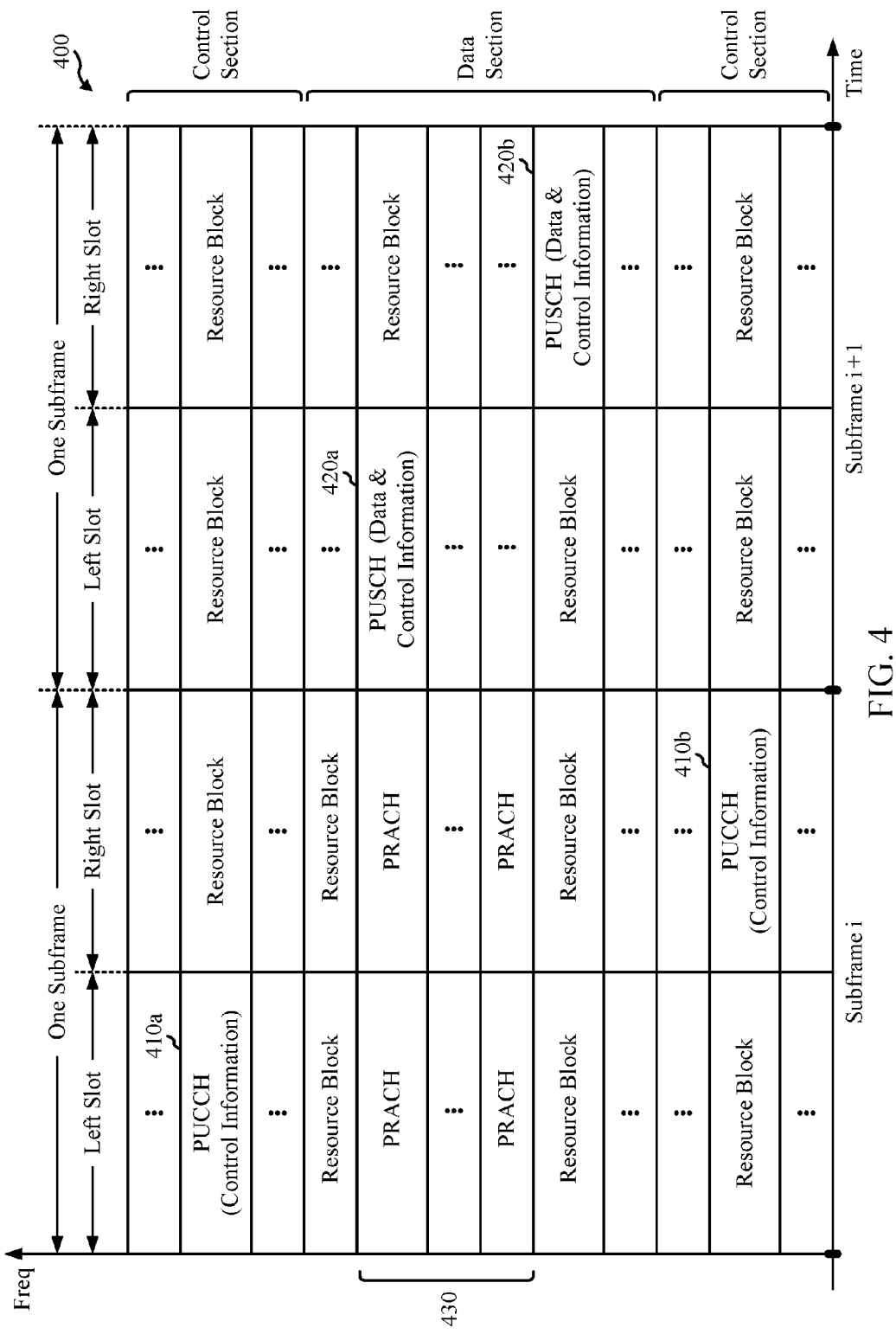
FIG. 4 is a diagram illustrating an example of an uplink frame structure in an access network, in accordance with certain aspects of the present disclosure.

FIG. 4 is a diagram 400 illustrating an example of an UL frame structure in an access network. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to a BS. The UE may also be assigned resource blocks 420a, 420b in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

In certain systems (e.g., such as NR or 5G systems), a BS may transmit these or other signals in these locations or in different locations of the subframe.

Figure 5:
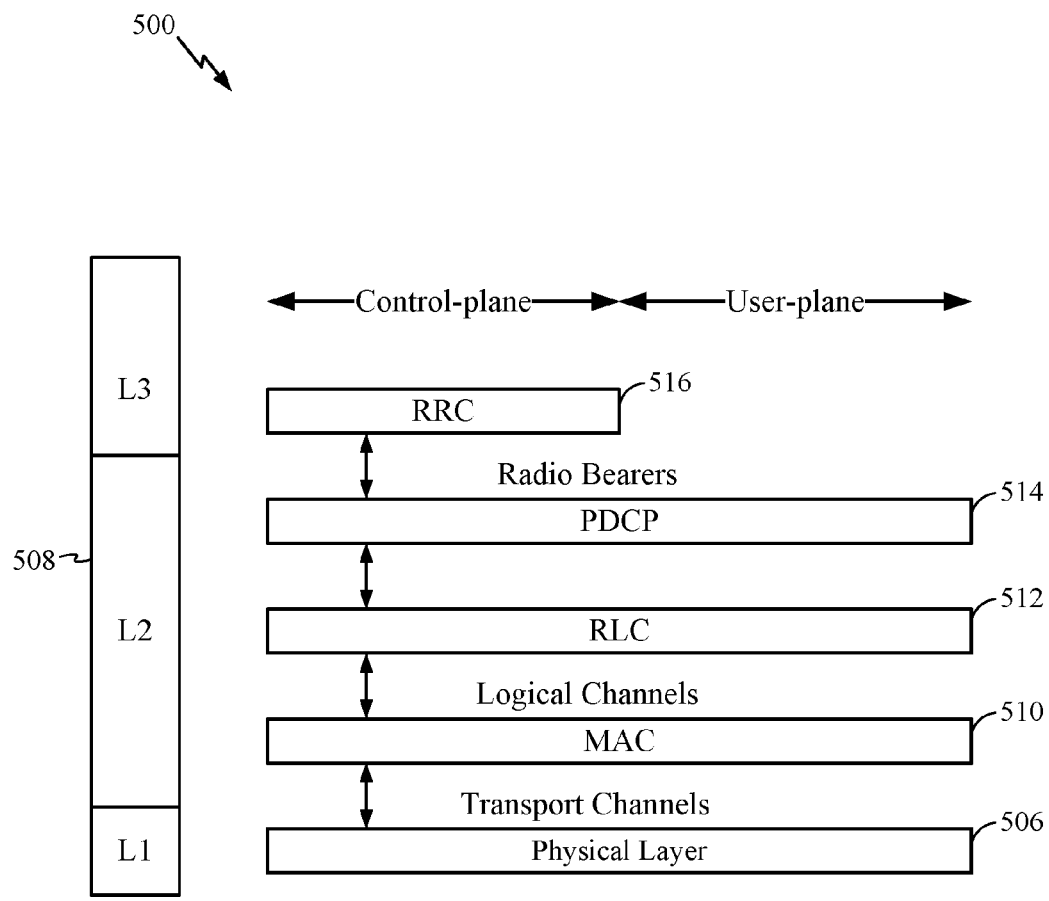
FIG. 5 is a diagram illustrating an example of a radio protocol architecture for the user and control plane, in accordance with certain aspects of the present disclosure.

FIG. 5 is a diagram 500 illustrating an example of a radio protocol architecture for the user and control planes in an access network. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the BS and the UE.

Figure 6:
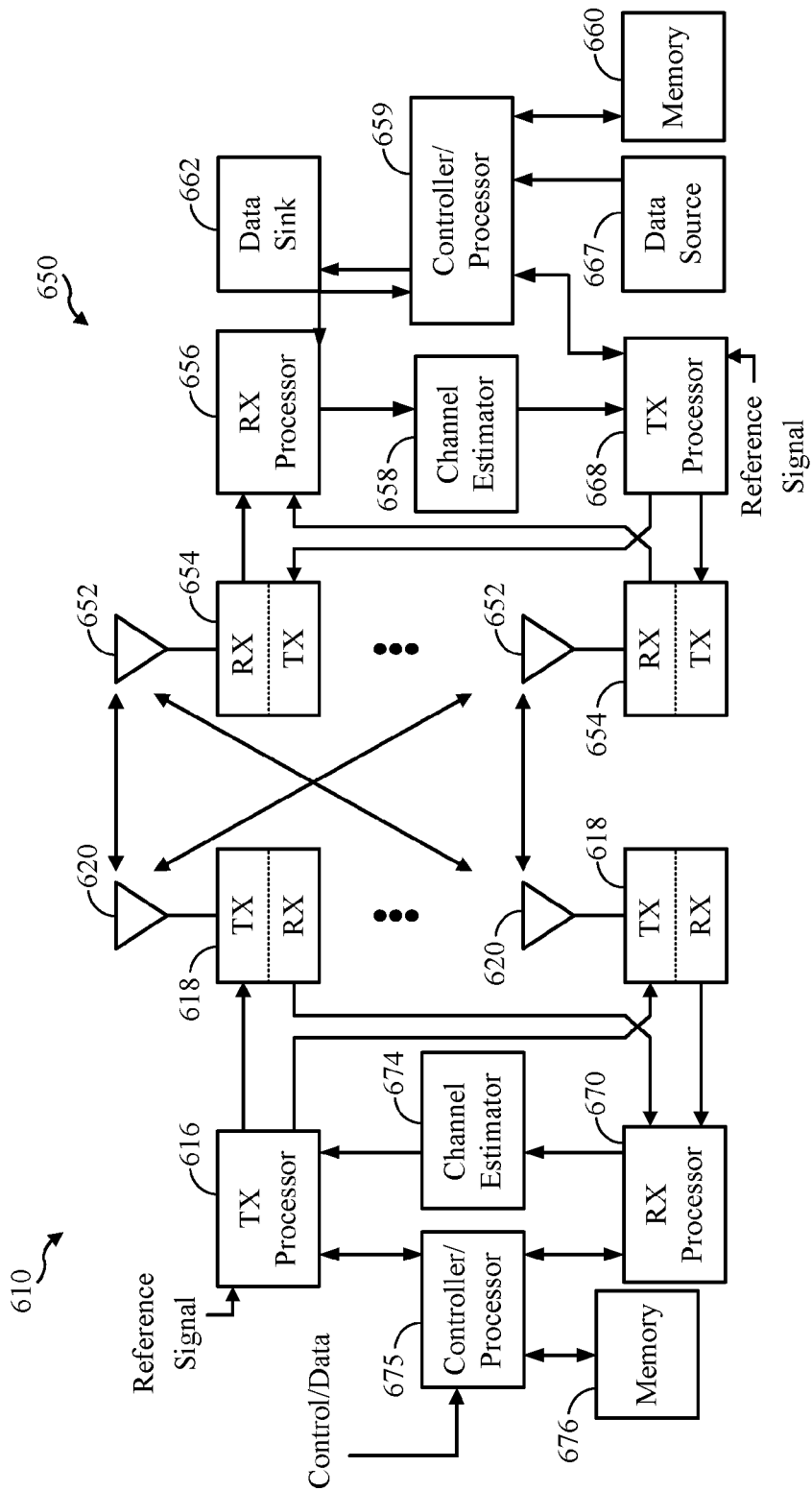
FIG. 6 is a diagram illustrating an example of a base station and user equipment in an access network, in accordance with certain aspects of the disclosure.

FIG. 6 is a block diagram of a BS 610 in communication with a UE 650 in an access network, in which aspects of the present disclosure may be practiced.

In certain aspects, a UE (e.g., UE 650) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) (e.g., BS 610) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

It may be noted that the UE noted above for implementing the new transmission scheme for NB-IoT in accordance with certain aspects of the present disclosure may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the BS 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the BS 610. These soft decisions may be based on channel estimates computed by the channel estimator 658. The soft decisions are then decoded and deinterleaved to recover the data and control signals that were originally transmitted by the BS 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the BS 610, the controller/processor 659 implements the L2 layer for the user plane and the control plane by providing header compression, ciphering, packet segmentation and reordering, and multiplexing between logical and transport channels based on radio resource allocations by the BS 610. The controller/processor 659 is also responsible for HARQ operations, retransmission of lost packets, and signaling to the BS 610.

Channel estimates derived by a channel estimator 658 from a reference signal or feedback transmitted by the BS 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the BS 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the BS 610 and the UE 650, respectively.

Figure 13:
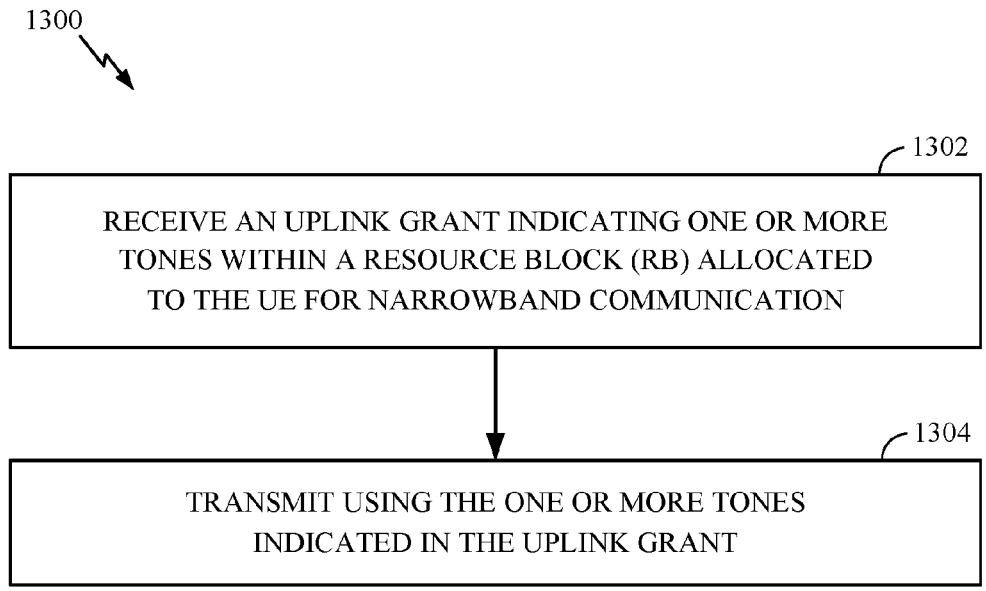
FIG. 13 is a flow chart illustrating example operations performed by a UE for receiving uplink grants for NB-IoT, in accordance with certain aspects of the present disclosure.

The controller/processor 659 and/or other processors, components and/or modules at the UE 650 may perform or direct operations, for example, operations 1300 in FIG. 13, and/or other processes for the techniques described herein for uplink grants for NB-IoT. Further, the controller/processor 675 and/or other processors, components and/or modules at the BS 610 may perform or direct operations, for example, operations 1400 in FIG. 14, and/or other processes for the techniques described herein for uplink grants for NB-IoT. In certain aspects, one or more of any of the components shown in FIG. 6 may be employed to perform example operations 1300 and 1400, and/or other processes for the techniques described herein. The memories 660 and 676 may store data and program codes for the UE 650 and BS 610 respectively, accessible and executable by one or more other components of the UE 650 and the BS 610.

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces or with modifications to existing OFDMA-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
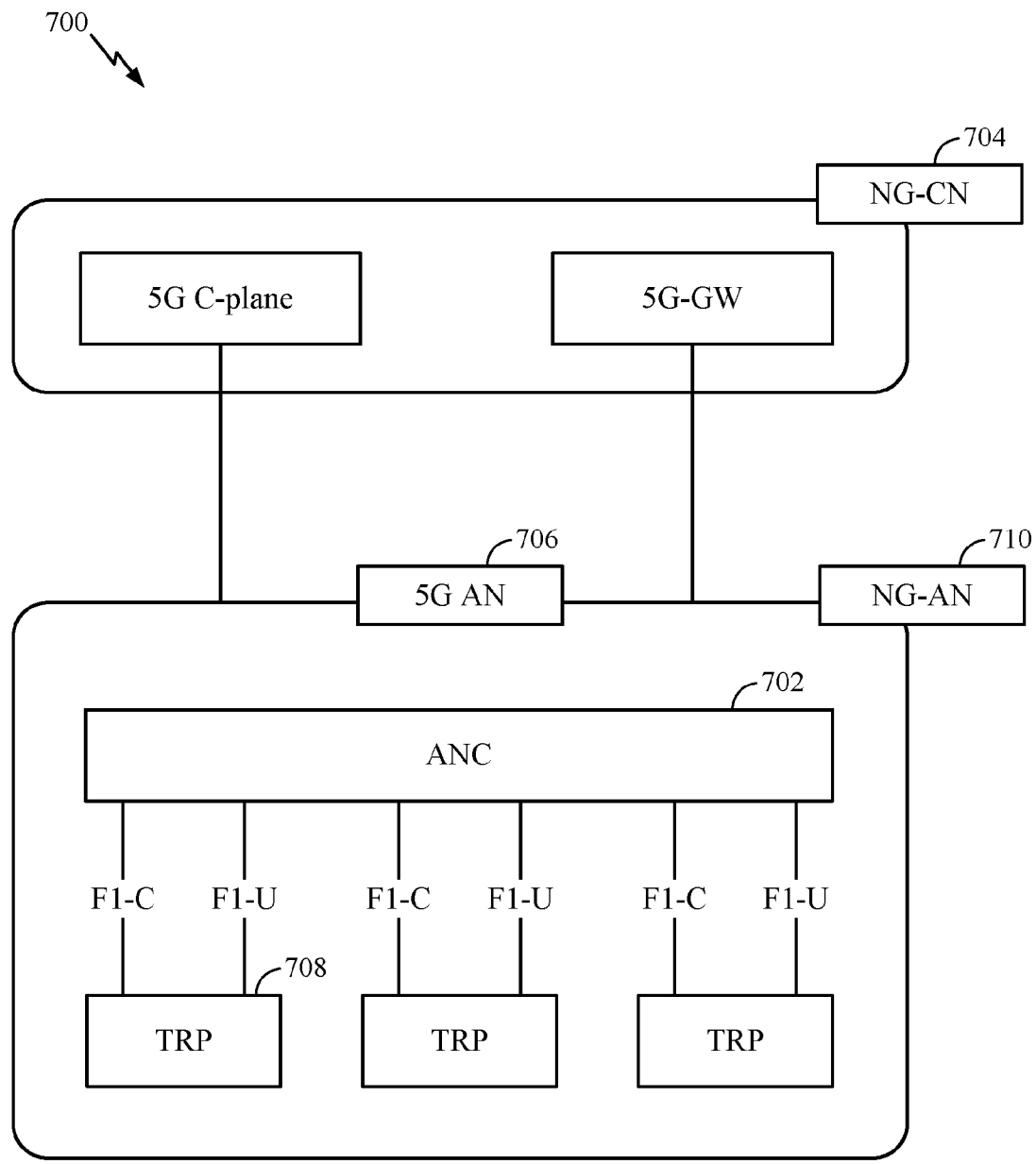
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
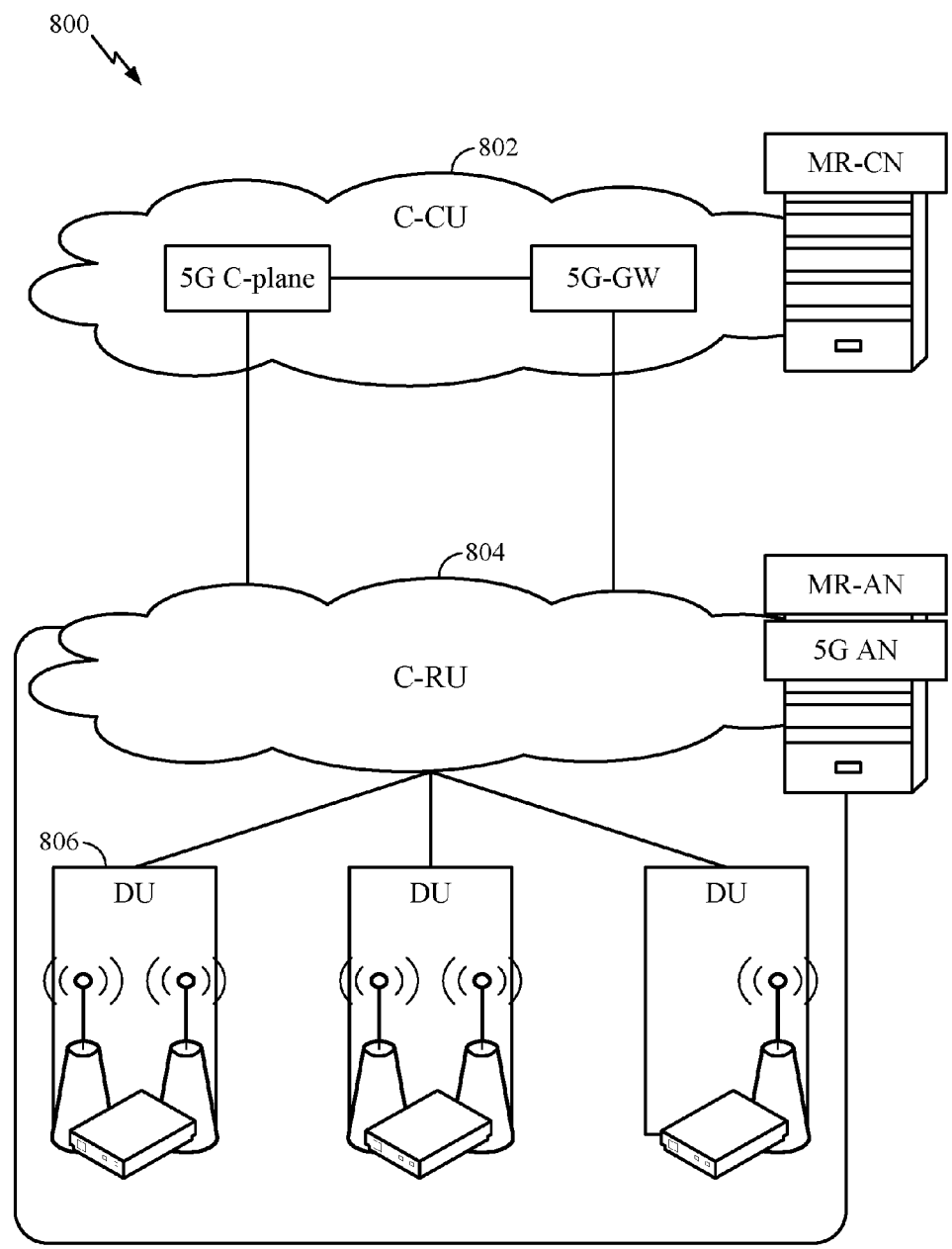
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
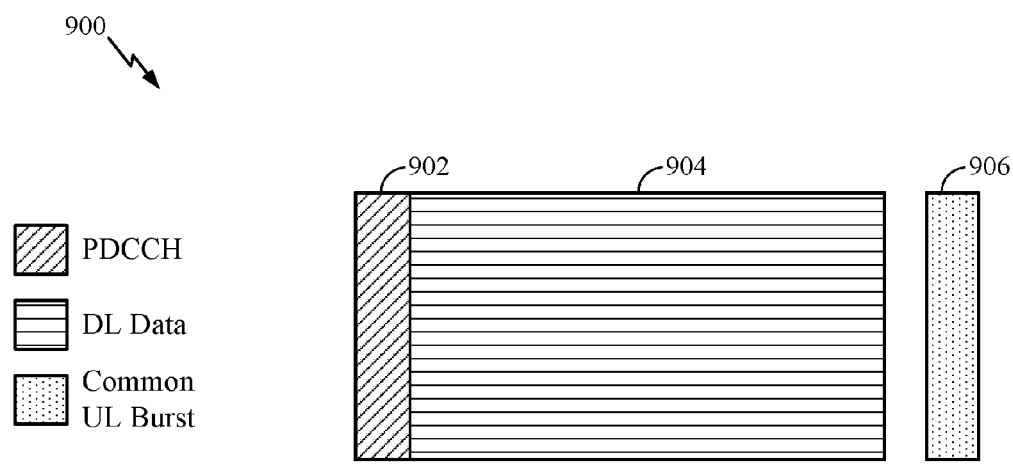
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
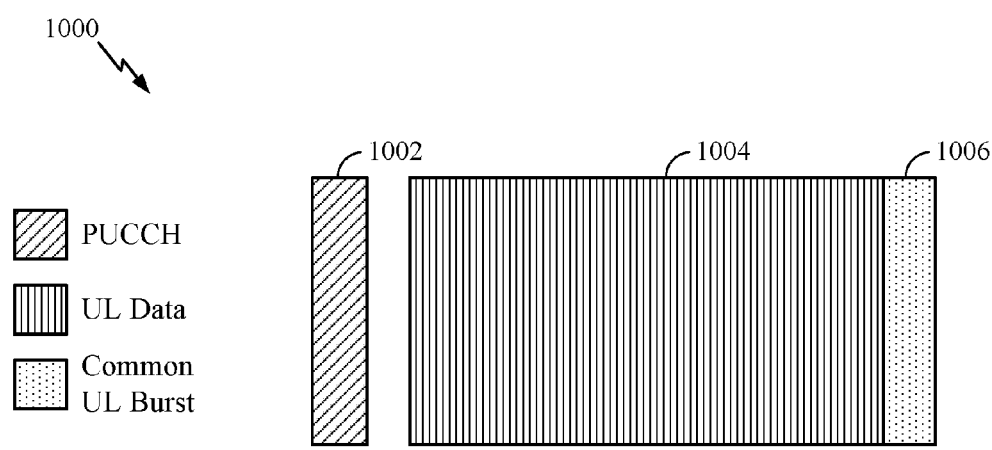
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical uplink control channel (PUCCH). In some configurations, the data portion may be a physical uplink shared channel (PUSCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a distributed unit (DU), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

Figure 11:
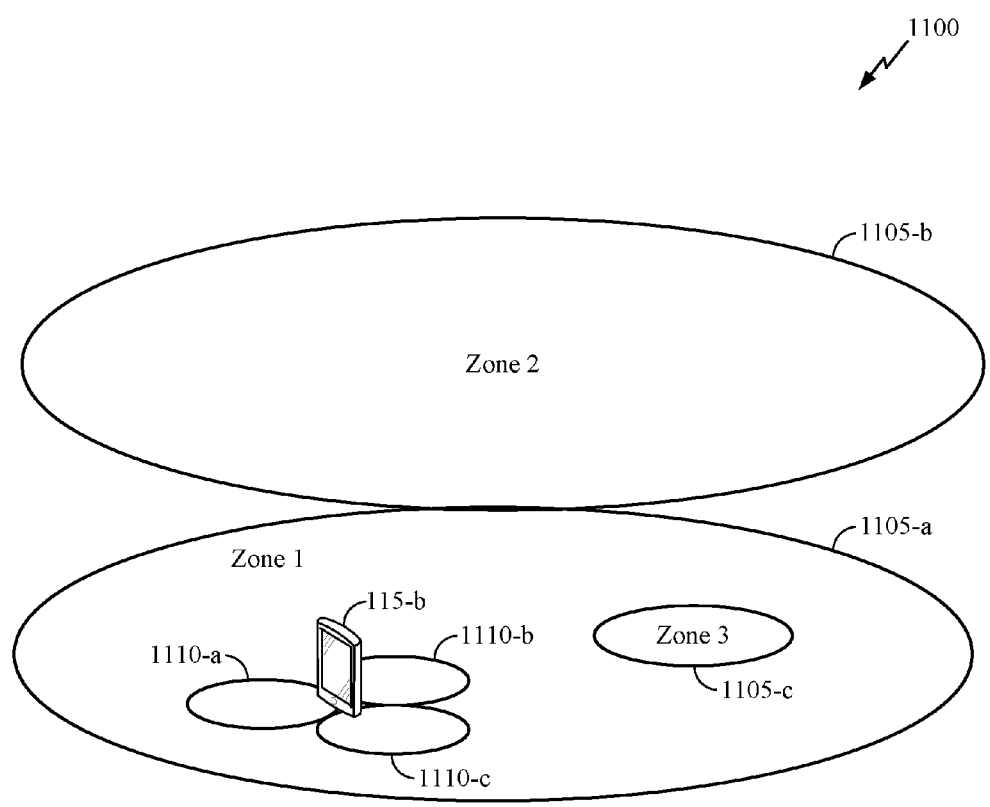
FIG. 11 illustrates an example of a wireless communication system 1100, in accordance with certain aspects of the present disclosure.

FIG. 11 illustrates an example of a wireless communication system 1100, in accordance with various aspects of the present disclosure. The wireless communication system 1100 may include a number of zones (including, e.g., a first zone 1105-*a* (Zone 1), a second zone 1105-*b* (Zone 2), and a third zone 1105-*c* (Zone 3)). A number of UEs, including UE 115-*b*, may move within or between the zones.

A zone may include multiple cells, and the cells within a zone may be synchronized (e.g., the cells may share the same timing). Wireless communication system 1100 may include examples of both non-overlapping zones (e.g., the first zone 1105-*a* and the second zone 1105-*b*) and overlapping zones (e.g., the first zone 1105-*a* and the third zone 1105-*c*). In some examples, the first zone 1105-*a* and the second zone 1105-*b* may each include one or more macro cells, micro cells, or pico cells, and the third zone 1105-*c* may include one or more femto cells.

By way of example, the UE 115-*b* is shown to be located in the first zone 1105-*a*. If the UE 115-*b* is operating with a radio resource configuration associated with transmitting pilot signals using a common set of resources, such as an RRC common state, the UE 115-*b* may transmit a pilot signal using a common set of resources. Cells (e.g., ANs, DUs, etc.) within the first zone 1105-*a* may monitor the common set of resources for a pilot signal from the UE 115-*b*. If the UE 115-*b* is operating with a radio resource configuration associated with transmitting pilot signals using a dedicated set of resource, such as an RRC dedicated state, the UE 115-*b* may transmit a pilot signal using a dedicated set of resources. Cells of a monitoring set of cells established for the UE 115-*b* within the first zone 1105-*a* (e.g., a first cell 1110-*a*, a second cell 1110-*b*, and a third cell 1110-*c*) may monitor the dedicated set of resources for the pilot signal of the UE 115-*b*.

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure.

Narrowband IoT (NB-IoT) may refer to a narrowband radio technology specially designed for the IoT. NB-IoT may focus on indoor coverage, low cost, long battery life, and large number of devices. To reduce the complexity of UEs, NB-IoT may allow for narrowband deployments utilizing one physical resource block (PRB) (e.g., 180 kHz+20 kHz guard band). NB-IoT deployments may utilize higher layer components of certain systems (e.g., LTE) and hardware to allow for reduced fragmentation and cross compatibility with, for example, NB-LTE and/or enhanced/evolved machine type communications (eMTC).

Figure 12:
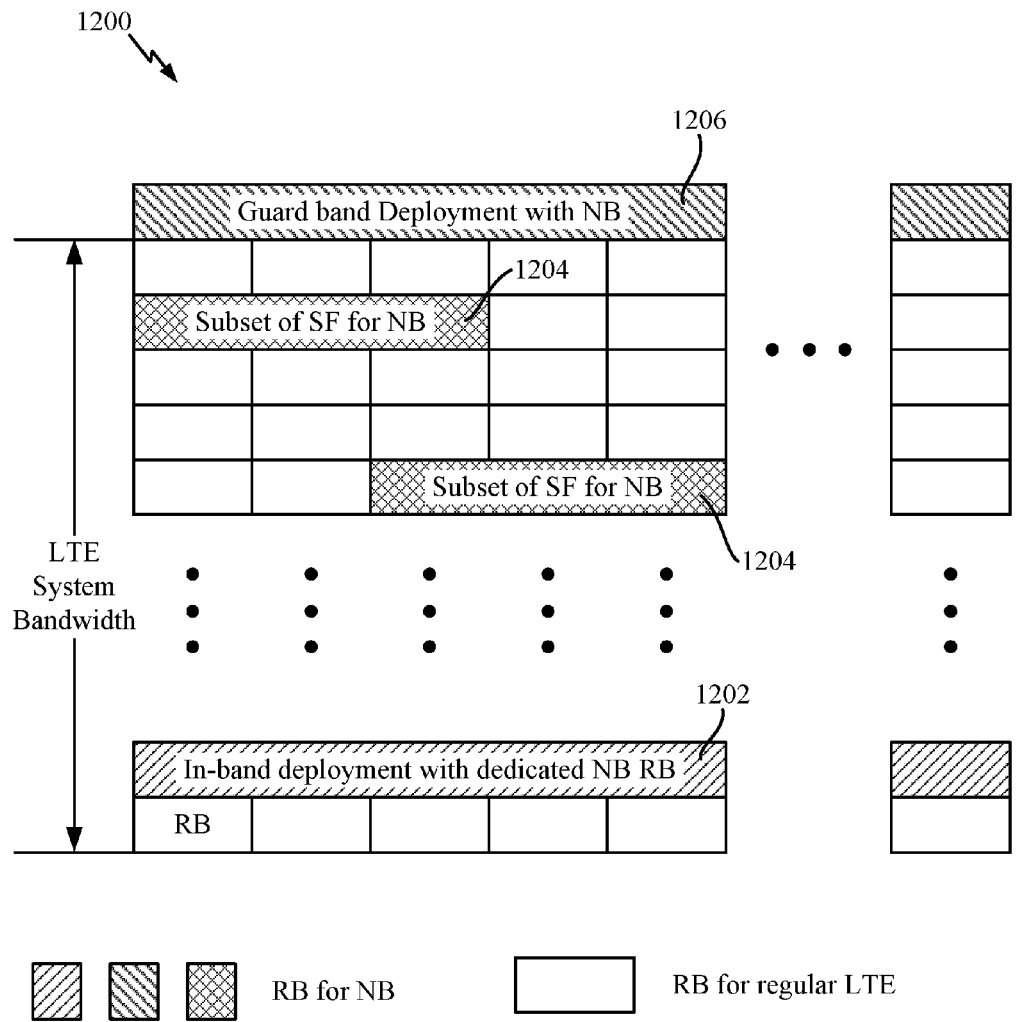
FIG. 12 illustrates an example deployment of narrowband Internet-of-Things (NB-IoT), according to certain aspects of the present disclosure.

FIG. 12 illustrates an example deployment 1200 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 12, a dedicated resource block (RB) 1202 within that bandwidth may be available for use by NB-IoT and/or the RBs 1204 may be dynamically allocated for NB-IoT. As shown in FIG. 12, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 1206 of the wideband channel.

In other deployments, NB-IoT may be deployed standalone (not shown). In a standalone deployment, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

Example Uplink Grants for Narrowband Internet-of-Things

Narrowband Internet-of-Things (NB-IoT) may use orthogonal frequency division multiplexing (OFDM) with long term evolution (LTE) numerology. For example, certain NB-IoT deployments (e.g., downlink NB-IoT) may have 15 kHz tone spacing and a symbols length of around 70 µs.

NB-IoT may support single-tone and/or multi-tone assignments. Thus, a scheduling unit size for NB-IoT may have a granularity of one tone or multiple tones. Signaling to support uplink grants for single-tone and multi-tone assignments may be desirable.

Certain aspects of the present disclosure provide uplink grants and uplink design for NB-IoT.

In certain NB-IoT deployments (e.g., using frequency division duplexing (FDD)), a scheduled resource unit (e.g., scheduled for data transmission in a physical uplink shared channel (PUSCH)), may correspond to x ms in the time domain. In the frequency domain, the scheduled resource unit may include a single 15 kHz or 3.75 kHz tone or may be include multiple 15 kHz or 3.75 kHz tone (e.g., depending on single tone allocation or multi-tone allocation and the tone spacing).

For 15 kHz tone spacing, up to 12 tones (e.g., $\{12,8\}$) can be used in a resource unit with single tone allocation and for 3.75 kHz tone spacing up to 48 tones (e.g., $\{48,32\}$) can be used in a resource unit with single tone allocation. In the case of multi-tone allocation for one UE, $x\{m\}$ is smaller than $x(1_{15kHz})$, where m is the number of tones allocated. In the case of 12 tone allocation for one UE (m=12), $x\{12\}$ is 1 ms. Some UEs may support single tone allocation (e.g., due to radio frequency constraints) and 3.75 kHz tone spacing.

According to certain aspects, in addition to or alternatively to single-tone resource allocation, a BS (e.g., such as BS 204) may also use multi-tone allocations to schedule a UE (e.g., such as UE 206). For example, the BS may use 3-tone, 6-tone, and/or 12-tone resource allocations (e.g., scheduling unit sizes) to schedule uplink transmissions from the UE. The BS may schedule a transmission block over more than one resource unit in time.

In order to schedule uplink single-tone or multi-tone transmission, the BS may provide uplink grants to the UE. For example, the BS uplink grants may send the uplink grants to the UE in downlink control information (DCI). Thus, it is desirable to have an uplink grant design in which the DCI may be able to schedule using single-tone and/or multi-tone (e.g., 3-tone, 6-tone, and/or 12-tone) allocation sizes.

According to certain aspects, various modulations schemes may be supported for NB-IoT. Modulation schemes can include single tone modulation schemes, multi-tone modulation schemes with single-carrier frequency division multiplexing (SC-FDM), multi-tone modulation schemes with tone position shift keying (TPSK) where information is transmitted in one tone and by tone position, and 8 binary phase shift keying (BPSK) corresponding to constrained 8-PSK modulation with reduced peak-to-average power ratio (PAPR) (e.g., at or near 0 dB). It may be desirable for DCI to indicate the modulation scheme in addition to the single-tone and/or multi-tone resource allocation.

FIG. 13 illustrates example operations 1300 for receiving uplink grants for NB-IoT, in accordance with certain aspects of the present disclosure. The operations 1300 may be performed, for example, by a UE (e.g., UE 102, 206, 650), which be an IoT device. The operations 1300 begin, at 1302, by receiving an uplink grant indicating one or more tones within a RB allocated to the UE for narrowband communications. At 1304, the UE transmits using the one or more tones indicated in the uplink grant.

Figure 14:
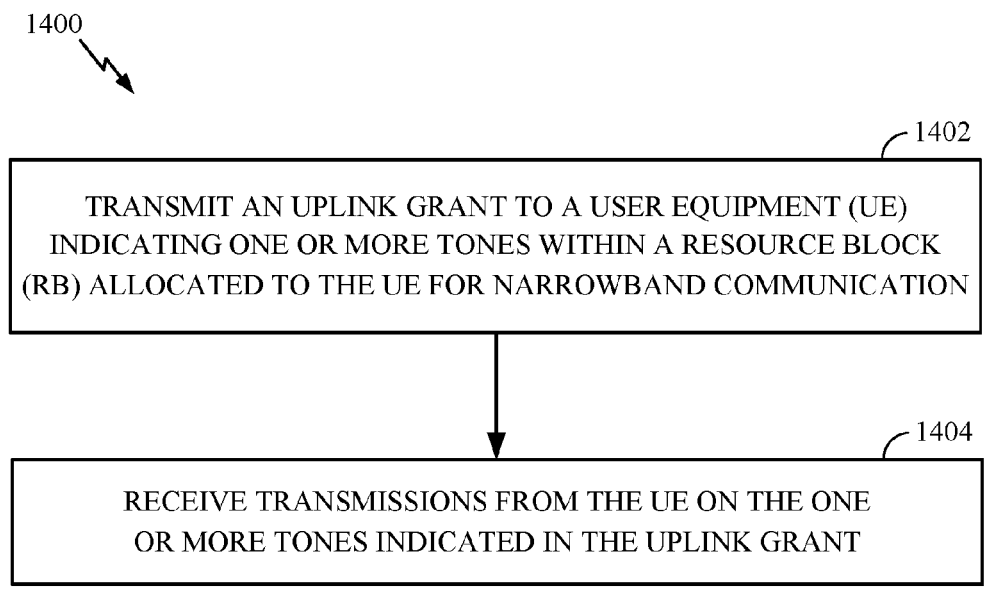
FIG. 14 is a flow chart illustrating example operations performed by a base station for transmitting uplink grants for NB-IoT, in accordance with certain aspects of the present disclosure.

FIG. 14 illustrates example operations 1400 for providing uplink grants for NB-IoT, in accordance with certain aspects of the present disclosure. The operations 1400 may be performed, for example, by a base station (e.g., BS 106, 108, 204, 610). The operations 1400 may be complementary to the operations 1300 performed by the UE. The operations 1400 begin, at 1402, by sending an uplink grant to a UE indicating one or more tones within a RB allocated to the UE for narrowband communication. At 1404, the base station receives transmissions from the UE on the one or more tones indicated in the uplink grant.

Example Uplink Grant Using Contiguous Tone Resource Allocation

According to certain aspects, the BS may send an uplink grant that allocates contiguous tones for the UE to use for a narrowband uplink transmission. For example, the BS may be restricted to resource allocations of contiguous tones. Limiting the uplink grant to scheduling contiguous tones may reduce the number of combinations to be signaled in the grant. For example, in the case of a one RB narrowband and a 15 kHz tone spacing: for a single contiguous tone resource allocation, there may be twelve (12) combinations (e.g., possible locations within the RB to signal the tone); for three (3) contiguous tone resource allocation, there may be ten (10) combinations (e.g., ten possible starting locations in the RB for a three contiguous tone allocation); for a six (6) contiguous tone resource allocation, there may be seven (7) combinations (e.g., seven possible starting location in the RB for a seven contiguous tone allocation); and for a twelve (12) contiguous tone resource allocation, there is only one (1) possible combination (e.g., a single possibly starting location within the RB for a twelve contiguous tone resource allocation).

Thus, it may be desirable for the uplink grant to be able to indicate any of the thirty (30) possible combinations (e.g., 12+10+7+1=30 total possible combinations for the case of 1 RB narrowband, 15 kHz tone spacing, and single-tone, 3-tone, 6-tone, and 12-tone resource allocation sizes). In this case, for example, the BS may use values of five (5) bits (e.g., a 5 bit uplink grant design) to signal the thirty (30) possible combinations with two spare combinations. In aspects, the BS may use the remaining two combinations to allocate non-contiguous tones. For example, for 6-tone allocation, the BS may indicate two comb-like structures (e.g., odd tones, even tones).

For multi-tone allocations, the BS may configure the UE may be configured by radio resource control (RRC) signaling with the multi-tone modulation scheme. The configuration may take into account UE capability. The modulation scheme may include SC-FDM, 8-BPSK, or TPSK.

Example Uplink Grant with Restricted Starting Tone Position

The number of possible combinations to be signaled in an uplink grant may be further reduced, for example, to reduce the number of bits for the uplink grant. According to certain aspects, starting tone positions within the RB for the resource allocation may be restricted (e.g., to a subset of tones within the RB). For example, instead of every tone in the resource block being a possible starting tone, the available starting tones may be restricted to a reduced set. In one example, for a 3-tone resource allocation, the available starting tones may be restricted to 0, 3, 6, or 9 (e.g., considering the tones within the RB to be tones 0-11). Thus, for 3-tone resource allocation there may be four (4) combinations (e.g., as opposed to ten possible combinations in the case where the starting tones are unrestricted). For the single-tone resource allocation there may be twelve (12) combinations. For the 6-tone resource allocation there may be two (2) combinations. For the 12-tone resource allocation there may be one combination. Thus, in one example, the starting positions for resource allocations may be restricted such that the total number of combinations to be signaled in the uplink grant can be further reduced to nineteen (19) combinations by restricting the available starting tone positions.

According to certain aspects, the remaining thirteen (13) combinations (e.g., assuming a 5-bit uplink grant is used for the above example) can be used to signal comb-like structures for 3-tone and 6-tone resource allocations, for example, the schemes with multi-tone for TPSK. In aspects, another seven (7) combinations can be added for 8-BPSK and/or SC-FDM. Accordingly, the resource allocation field can indicate both the tone resource allocation (contiguous and/or comb-like) and the transmission mode (e.g., modulation).

According to certain aspects, different resource unit sizes can be used, different scheduling unit sizes can be used, different tone spacing, and/or different restrictions can be used for the starting tones with in the resource unit.

Example Uplink Grant Size

As mentioned above, the UE may be configured for 3.75 kHz tone spacing or 15 kHz tone spacing. If the UE is configured with 3.75 kHz tone spacing, the number of possible combinations of tones within the narrowband (e.g., a 1 RB narrowband) for resource allocation in an uplink grant (e.g., provide via different values of bits in a DCI) is much larger than for 15 kHz, even if only single tone is supported (e.g., 48 combinations for 3.75 kHz tone spacing versus 12 combinations for 15 kHz tone spacing).

Thus, according to certain aspects, the number of bits in DCI used for the uplink grant may be different depending on the tone spacing. For example, for 3.75 kHz tone spacing, the uplink grant size may be six (6) bits, whereas for 15 kHz tone spacing the uplink grant size may be only five (5) bits.

In the case of matching grant size for uplink and downlink, then the downlink grant size may include additional padding bits to align with the increased uplink grant size. In aspects, the BS may use the remaining 16 combinations (e.g., since only 48 of 64 combinations are used in the case 3.75 kHz single-tone allocation) to signal multi-tone resource allocation or single tone resource allocation with 15 kHz tone spacing.

Alternatively, the BS may use the same number of bits used for the uplink grant with 3.75 kHz tone spacing as the uplink grant size for 15 kHz tone spacing. For example, for the 3.75 kHz tone spacing, the uplink grant size may be 5 bits. In this case, the number of resource elements (REs) that can be allocated to the UE may be constrained (e.g., since the 32 combinations that can signaled using 5 bits for the uplink is not enough to signal the 48 possible combinations for 3.75 kHz tone spacing). The configuration of which tones are available to the UE may be determined implicitly or explicitly. For example, the configuration can be determined implicitly based on the UE ID and/or radio network temporary identifier (RNTI) or the BS can explicitly signal the UE (e.g., using radio resource control (RRC) signaling) which tones are available. In aspects, the starting tone may be signaled (e.g., with wrap-around) or can be obtained from the UE RNTI (e.g., using RNTI mod 48). The 5-bit resource allocation field may indicate which tone inside the set is used.

Example Uplink Grant with Frequency Hopping

According to certain aspects, the options described above may be changed based RRC signaling and/or UE capability. For example, if the UE supports only single-tone resource allocation (e.g., the UE is not capable of TPSK) and/or if the UE is in deep coverage mode, then the combinations for multi-tone modulation may be considered invalid and the uplink grant may be dropped. Alternatively, the uplink grant may be interpreted in a different way instead of being dropped (e.g., the multi-tone entries might be reused to signal single tone with frequency hopping).

According to certain aspects, a separate bit for "frequency hopping" can be included in the uplink grant. This bit can be used to signal if the UE should change the tone(s) location within the transmission. This may help the BS with time tracking.

In the case of 12-tone resource allocation, 1 RB resource unit, and 15 kHz stone spacing, there is no frequency hopping available (e.g., since all the uplink resources are used). In this case (or in the case other tone sizes that do not support frequency hopping), the value of the frequency hopping bit can be used to signal the modulation type being used, the modulation and coding scheme (MCS), or fixed to a value (e.g., 0) to indicate to drop the grant.

According to certain aspect, the frequency hopping may follow a tree-based structure (e.g., similar to sounding reference signal (SRS) frequency hopping). For example, four (4) groups of three (3) REs and two (2) groups of six (6) REs may be defined. The UE may be configured and/or signaled in the uplink grant (e.g., via the frequency hopping bit) with different levels of hopping. For narrowband hopping, the UE may frequency hop only inside the next group (e.g., if single tone allocation is used), the UE may hop in the group of three (3) REs (e.g., if 3-tone allocation is used), or the UE may hop in the group of 6 REs. For wideband hopping, the UE may use the all twelve (12) Res in the RB for frequency hopping. An additional level can be defined for single tone UE (e.g., use 6 RE for hopping).

For 3.75 kHz tone spacing, the hopping pattern can be different. For example, half of the bandwidth may be reserved and UE may hop inside those twenty-four (24) REs. Alternatively, four different levels of hopping bandwidth can be defined, similarly to the 15 kHz case: hop within 15 kHz (e.g., 1 RE), 3 REs, 6 REs, or 12 REs.

In some aspects, for wideband hopping, the UE may hop within the narrowband, and then hop within the narrowband. In some aspects, the hopping time unit may be at the slot level or at the subframe level. Instead of being signaled on a UE basis, the BS may broadcast the groups that hop or the maximum RE size that hops (e.g., hopping up to 6 REs, no hopping for 6 REs so hopping is always performed using half of the bandwidth). The hopping sequence can also be a function of cell ID to perform inter-cell interference randomization.

FIGS. 15-18 are time frequency resource grids illustrating example frequency hopping patterns for 15 kHz tone spacing, in accordance with certain aspects of the present disclosure.

Figure 15:
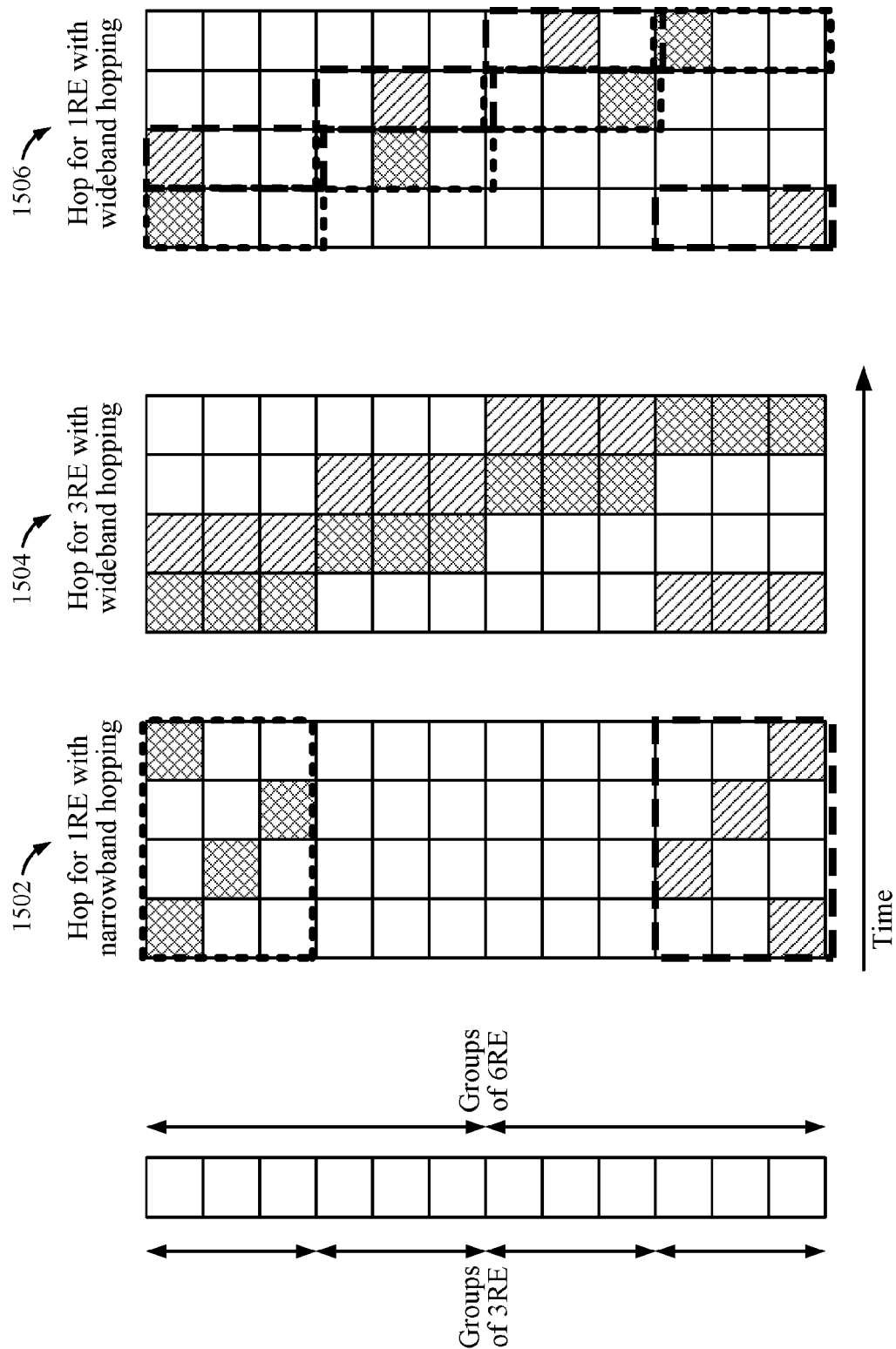
FIGS. 15-18 are diagrams illustrating example frequency hopping patterns for 15 kHz tone spacing, in accordance with certain aspects of the present disclosure.

According to certain aspects, the wideband hopping for level N can be constructed by using the hopping of level N+1 where level 0 is 3.75 kHz single tone; level 1 is 15 kHz single tone; level 2 is 3 RE; level 3 is 6 RE; and level 4 is 12 RE (no hopping). In FIG. 15, resource grid 1502 shows a frequency hopping pattern for 1 RE with narrowband hopping; resource grid 1502 shows a frequency hopping pattern for 3 RE with wideband hopping; and resource grid 1506 shows a frequency hopping pattern for 1 RE with wideband hopping. The frequency hopping pattern for 1 RE with wideband hopping is obtained by hopping inside the narrowband according to resource grid 1502, and further hopping within the narrowband according to resource grid 1504.

Figure 16:
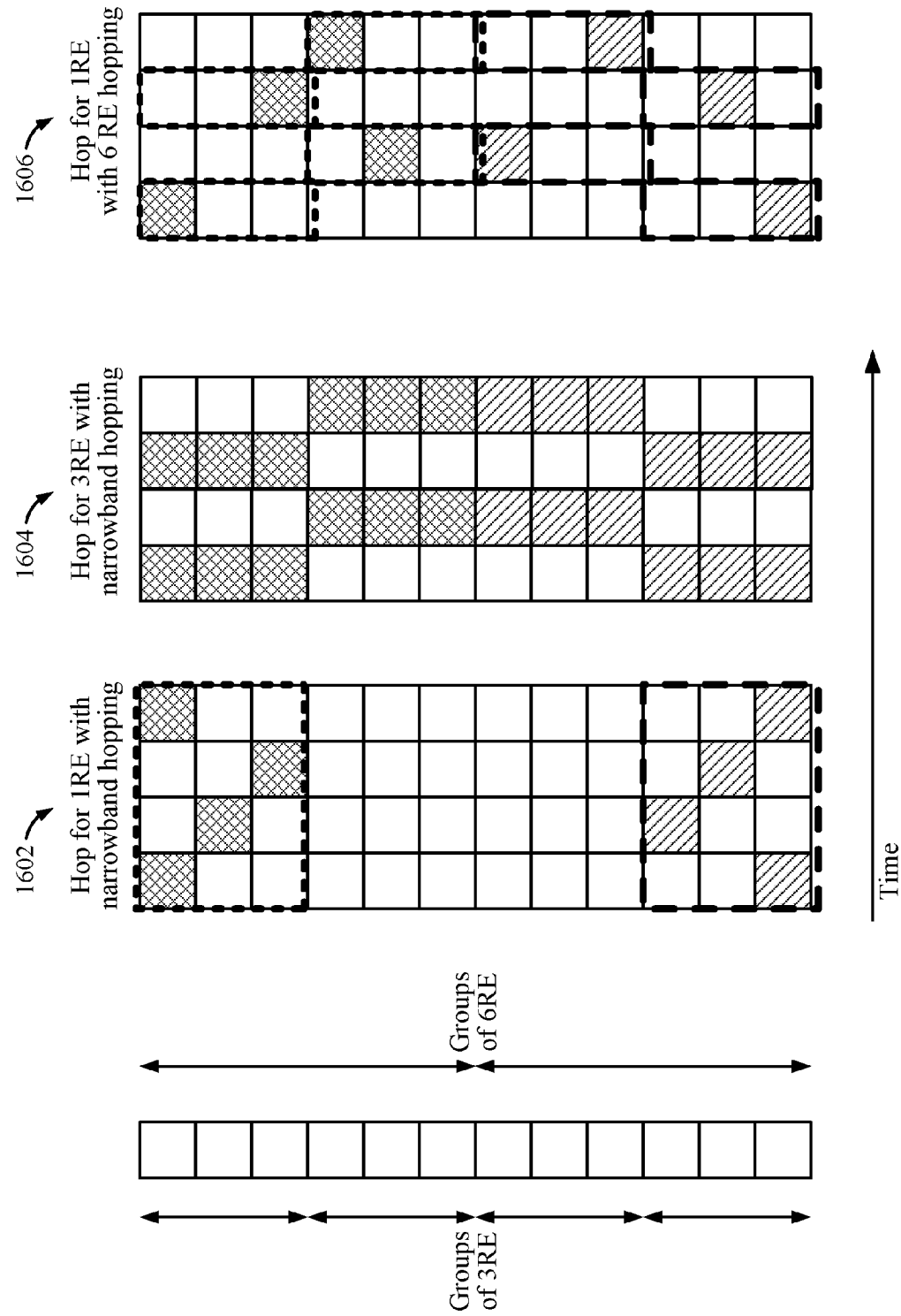

FIG. 16 shows frequency hopping patterns if wideband hopping is disabled for 6 RE. In FIG. 16, resource grid 1602 shows a frequency hopping pattern for 1 RE with narrowband hopping; resource grid 1604 shows a frequency hopping pattern for 3 RE with narrowband hopping; and resource grid 1606 shows a frequency hopping pattern for 1 RE with 6 RE hopping.

Figure 17:
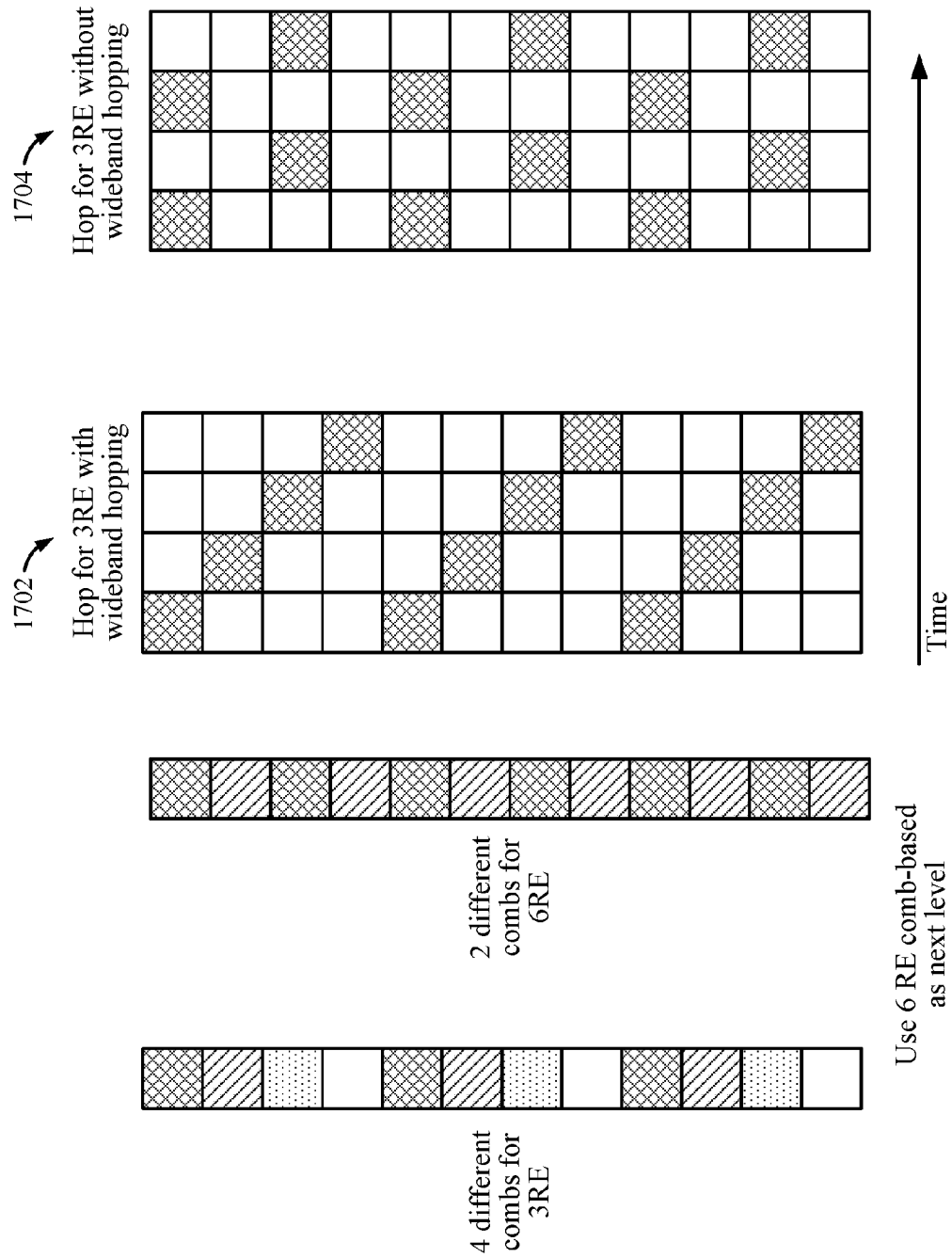
Figure 18:
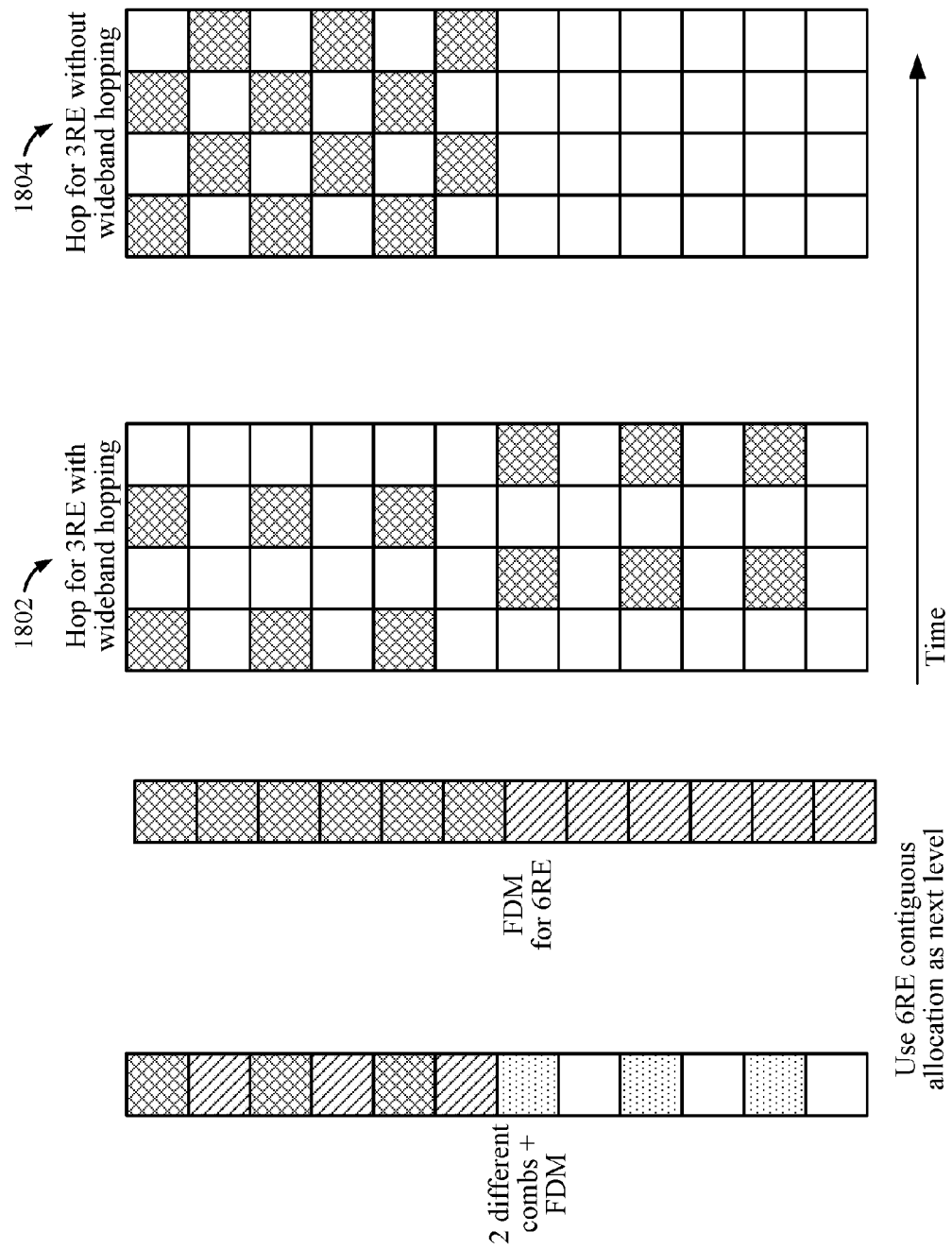

FIGS. 17 and 18 show frequency hopping patterns for 15 kHz tone spacing with comb-based structure. In FIG. 17, resource grid 1702 shows a frequency hopping pattern for 3 RE with wideband hopping and resource grid 1704 shows a frequency hopping pattern for 3 RE without wideband hopping. In FIG. 18, resource grid 1802 shows a another frequency hopping pattern for 3 RE with wideband hopping and resource grid 1804 shows another frequency hopping pattern 3 RE without wideband hopping.

The techniques herein may for uplink grants to schedule NB-IoT communications may provide for uplink grants that support single-tone and/or multi-tone resource allocations for various resource unit sizes, tone spacing, and/or scheduling unit sizes. The techniques herein for restricting uplink grants to contiguous resource allocations and/or restricted starting tone positions may allow for reducing the size of uplink grants.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for indicating, and/or means for including, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    receiving an uplink grant indicating, via a set of bits, one or more tones within a resource block (RB) allocated to the UE for narrowband communication using a scheduling unit size of at least one of: a single tone, three tones, six tones, or twelve tones, wherein:
        different values of the set of bits indicate different combinations of one or more contiguous tones within the RB;
        the different combinations are based on the scheduling unit size; and
        starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
    transmitting using the one or more tones indicated in the uplink grant.

2. The method of claim 1, wherein the one or more tones comprise 15 kHz tones or 3.75 kHz tones.

3. The method of claim 1, wherein the set of bits comprises a first number of bits if the one or more tones comprise 3.75 kHz tones or a second number of bits that is fewer than the first number of bits if the one or more tones comprise 15 kHz tones.

4. The method of claim 3, wherein:
    the first number of bits comprises 6 bits; and
    the second number of bits comprises 5 bits.

5. The method of claim 1, wherein the set of bits comprises 5 bits.

6. The method of claim 1, wherein:
    a first set of the different values indicate different combinations of one or more contiguous tones; and
    a second set of the different values indicate a single tone allocation.

7. The method of claim 6, wherein a third set of the different values indicates non-contiguous tone allocation.

8. The method of claim 1, further comprising:
    receiving signaling indicating a modulation scheme for use when transmitting using the one or more tones indicated in the uplink grant.

9. The method of claim 8, wherein the signaling indicating the modulation scheme is provided via radio resource control (RRC) signaling.

10. The method of claim 8, wherein the modulation scheme comprises single carrier frequency division multiplexing (SC-FDM), 8-binary phase shift keying (BPSK), or tone position shift keying (TPSK).

11. The method of claim 8, wherein the signaling indicating the modulation scheme is also provided via the different values of the set of bits.

12. The method of claim 1, further comprising:
    providing an indication of UE capability, wherein the uplink grant is based on the indicated UE capability.

13. The method of claim 7, wherein the non-contiguous tone allocation comprises tones evenly spaced.

14. The method of claim 2, wherein:
    the one or more tones comprise 3.75 kHz tones; and
    the one or more tones are restricted to fewer tones than all of available tones in the RB.

15. The method of claim 14, wherein the restriction is based on an identifier of the UE or based on signaling from a base station (BS) indicating the restricted tones.

16. The method of claim 1, further comprising:
    receiving signaling indicating a frequency hopping pattern.

17. The method of claim 16, wherein the indication of the frequency hopping pattern indicates frequency hopping with a narrowband or a wideband and a number of tones to be frequency hopped.

18. The method of claim 17, wherein the indication of a number of tones to be frequency hopped is implicitly signaled based on a maximum bandwidth for which frequency hopping is allowed.

19. The method of claim 17, wherein the indication of the frequency hopping is broadcast by a base station.

20. The method of claim 17, wherein the number of tones to be frequency hopped are contiguous.

21. The method of claim 17, wherein the frequency hopping pattern is calculated recursively for different bandwidth sizes.

22. A method for wireless communications by a base station (BS), comprising:
sending an uplink grant to a user equipment (UE) indicating, via a set of bits, one or more tones within a resource block (RB) allocated to the UE for narrowband communication using a scheduling unit size of at least one of: a single tone, three tones, six tones, or twelve tones, wherein:
different values of the set of bits indicate different combinations of one or more contiguous tones within the RB;
the different combinations are based on the scheduling unit size; and
starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
receiving transmissions from the UE on the one or more tones indicated in the uplink grant.

23. The method of claim 22, wherein the one or more tones comprise 15 kHz tones or 3.75 kHz tones.

24. The method of claim 22, wherein the set of bits comprises a first number of bits if the one or more tones comprise 3.75 kHz tones or a second number of bits that is fewer than the first number of bits if the one or more tones comprise 15 kHz tones.

25. The method of claim 24, wherein:
the first number of bits comprises 6 bits; and
the second number of bits comprises 5 bits.

26. The method of claim 22, wherein the set of bits comprises 5 bits.

27. The method of claim 22, wherein:
a first set of the different values indicate different combinations of one or more contiguous tones; and
a second set of the different values indicate a single tone allocation.

28. The method of claim 27, wherein a third set of the different values indicates non-contiguous tone allocation.

29. The method of claim 22, further comprising:
signaling indicating a modulation scheme for the UE to use when transmitting on the one or more tones indicated in the uplink grant.

30. The method of claim 29, wherein the signaling indicating the modulation scheme is provided via radio resource control (RRC) signaling.

31. The method of claim 29, wherein the modulation scheme comprises single carrier frequency division multiplexing (SC-FDM), 8-binary phase shift keying (BPSK), or tone position shift keying (TPSK).

32. The method of claim 29, wherein the signaling indicating the modulation scheme is also provided via the different values of the set of bits.

33. The method of claim 22, further comprising:
receiving an indication of UE capability, wherein uplink grant is based on the indicated UE capability.

34. The method of claim 28, wherein the non-contiguous tone allocation comprises tones evenly spaced.

35. The method of claim 23, wherein:
the one or more tones comprise 3.75 kHz tones; and
the one or more tones are restricted to fewer tones than all of available tones in the RB.

36. The method of claim 35, wherein the restriction is based on an identifier of the UE or based on signaling from a base station (BS) indicating the restricted tones.

37. The method of claim 22, further comprising:
sending signaling indicating a frequency hopping pattern.

38. The method of claim 37, wherein the indication of the frequency hopping pattern indicates frequency hopping with a narrowband or a wideband and a number of tones to be frequency hopped.

39. The method of claim 38, wherein the indication of a number of tones to be frequency hopped is implicitly signaled based on a maximum bandwidth for which frequency hopping is allowed.

40. The method of claim 38, wherein sending the indication of the frequency hopping comprises broadcasting the indication.

41. The method of claim 38, wherein the number of tones to be frequency hopped are contiguous.

42. The method of claim 38, further comprising:
calculating the frequency hopping pattern recursively for different bandwidth sizes.

43. An apparatus for wireless communications by a user equipment (UE), comprising:
means for receiving an uplink grant indicating, via a set of bits, one or more tones within a resource block (RB) allocated to the UE for narrowband communication using a scheduling unit size of at least one of: a single tone, three tones, six tones, or twelve tones, wherein:
different values of the set of bits indicate different combinations of one or more contiguous tones within the RB;
the different combinations are based on the scheduling unit size; and
starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
means for transmitting using the one or more tones indicated in the uplink grant.

44. An apparatus for wireless communications by a base station (BS), comprising:
means for sending an uplink grant to a user equipment (UE) indicating, via a set of bits, one or more tones within a resource block (RB) allocated to the UE for narrowband communication using a scheduling unit size of at least one of: a single tone, three tones, six tones, or twelve tones, wherein:
different values of the set of bits indicate different combinations of one or more contiguous tones within the RB;
the different combinations are based on the scheduling unit size; and
starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
means for receiving transmissions from the UE on the one or more tones indicated in the uplink grant.

45. An apparatus for wireless communications by a user equipment (UE), comprising:
a receiver configured to receive an uplink grant indicating, via a set of bits, one or more tones within a resource block (RB) allocated to the UE for narrowband communication using a scheduling unit size of at least one of: a single tone, three tones, six tones, or twelve tones, wherein:
    different values of the set of bits indicate different combinations of one or more contiguous tones within the RB;
    the different combinations are based on the scheduling unit size; and
    starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
a transmitter configured to transmit using the one or more tones indicated in the uplink grant.

46. An apparatus for wireless communications by a base station (BS), comprising:
    a transmitter configured to send an uplink grant to a user equipment (UE) indicating, via a set of bits, one or more tones within a resource block (RB) allocated to the UE for narrowband communication using a scheduling unit size of at least one of: a single tone, three tones, six tones, or twelve tones, wherein:
        different values of the set of bits indicate different combinations of one or more contiguous tones within the RB;
        the different combinations are based on the scheduling unit size; and
        starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
    a receiver configured to receive transmissions from the UE on the one or more tones indicated in the uplink grant.

47. A non-transitory computer readable medium having computer executable code stored thereon, comprising:
    code for receiving an uplink grant indicating, via a set of bits, one or more tones within a resource block (RB) allocated to the UE for narrowband communication using a scheduling unit size of at least one of: a single tone, three tones, six tones, or twelve tones, wherein:
        different values of the set of bits indicate different combinations of one or more contiguous tones within the RB;
        the different combinations are based on the scheduling unit size; and
        starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
    code for transmitting using the one or more tones indicated in the uplink grant.

48. A non-transitory computer readable medium having computer executable code stored thereon, comprising:
    code for sending an uplink grant to a user equipment (UE) indicating, via a set of bits, one or more tones within a resource block (RB) allocated to the UE for narrowband communication using a scheduling unit size of at least one of: a single tone, three tones, six tones, or twelve tones, wherein:
        different values of the set of bits indicate different combinations of one or more contiguous tones within the RB;
        the different combinations are based on the scheduling unit size; and
        starting tone positions for the different combinations of one or more contiguous tones are restricted such that there is one combination for a scheduling unit size of twelve tones, two combinations for a scheduling unit size of six tones, four combinations for a scheduling unit size of three tones, and twelve combinations for a scheduling unit size of a single tone; and
    code for receiving transmissions from the UE on the one or more tones indicated in the uplink grant.

* * * * *